United States Patent
Park et al.

(10) Patent No.: US 9,908,445 B2
(45) Date of Patent: Mar. 6, 2018

(54) AUXILIARY SEAT STORAGE STRUCTURE

(71) Applicants: Hyundai Motor Company, Seoul (KR); Kia Motors Corporation, Seoul (KR); DAE WON SAN UP CO., LTD, Ansan, Gyeonggi-do (KR)

(72) Inventors: Il-Hong Park, Gyeonggi-do (KR); Byung-Jae Lee, Gyeonggi-do (KR); Hyun-Kyu Park, Gyeonggi-do (KR); Soo-Hyun Moon, Gyeonggi-do (KR); Jun-Yeol Heo, Gyeonggi-do (KR); Sang-Ho Kim, Incheon (KR); Dae-Ig Jung, Gyeonggi-do (KR); Keon-Soo Jin, Ulsan (KR); Hyuk Kim, Gyeonggi-do (KR); Do-Kyun Kim, Seoul (KR); Sang-Dong Lee, Gyeonggi-do (KR); Kyu-Jin Kim, Gyeonggi-do (KR); Tae-Hyung Kim, Gyeonggi-do (KR)

(73) Assignees: Hyundai Motor Company, Seoul (KR); Kia Motors Corporation, Seoul (KR); DAE WON SAN UP CO., LTD., Ansan, Gyeonggi-do (KR)

( * ) Notice: Subject to any disclaimer, the term of this patent is extended or adjusted under 35 U.S.C. 154(b) by 0 days.

(21) Appl. No.: 15/270,296

(22) Filed: Sep. 20, 2016

(65) Prior Publication Data
US 2017/0305306 A1  Oct. 26, 2017

(30) Foreign Application Priority Data
Apr. 21, 2016  (KR) .................. 10-2016-0048521

(51) Int. Cl.
*B60N 2/30* (2006.01)
*B60N 2/06* (2006.01)
(Continued)

(52) U.S. Cl.
CPC ............... *B60N 2/309* (2013.01); *B60N 2/01* (2013.01); *B60N 2/062* (2013.01); *B60N 2/065* (2013.01);
(Continued)

(58) Field of Classification Search
CPC ...... B60N 2/309; B60N 2/062; B60N 3/3011; B60N 2/01; B60N 2/3061; B60N 2/0806; B60N 2/065
(Continued)

(56) References Cited

U.S. PATENT DOCUMENTS 6,811,200 B2  11/2004  Shibata et al.
8,313,146 B2  11/2012  Wagner et al.
(Continued)

FOREIGN PATENT DOCUMENTS

JP  2005-178423 A  7/2005
JP  3898319 B2  3/2007
(Continued)

*Primary Examiner* — Rodney B White
(74) *Attorney, Agent, or Firm* — Mintz Levin Cohn Ferris Glovsky and Popeo, P.C.; Peter F. Corless

(57) ABSTRACT

A structure of an auxiliary seat disposed in a second row in a vehicle is provided. The auxiliary seat storage structure includes an auxiliary seat that is disposed between a pair of exterior seats and has a seat back rotatably coupled to a seat cushion by a recliner and a rail that is installed in a vehicle width direction. The auxiliary seat is configured to slide into an internal cavity at a lower end of the exterior seat. The auxiliary seat slides along the rail when the auxiliary seat is folded and simultaneously adjusted downward and is stored in a lower cavity of the exterior seat. A passageway cavity is maximized, the number of operating steps are minimized and the auxiliary seat are stored regardless of whether an occupant is seated on the exterior seat.

15 Claims, 7 Drawing Sheets

(51) Int. Cl.
*B60N 2/01* (2006.01)
*B60N 2/08* (2006.01)

(52) U.S. Cl.
CPC .......... *B60N 2/0806* (2013.01); *B60N 2/3011* (2013.01); *B60N 2/3061* (2013.01)

(58) Field of Classification Search
USPC ....................................... 297/234, 235, 236
See application file for complete search history.

(56) References Cited

U.S. PATENT DOCUMENTS

| | | | |
|---|---|---|---|
| 8,393,677 B2 * | 3/2013 | Wieclawski | B60N 2/2222 297/236 X |
| 2010/0032976 A1 * | 2/2010 | Yamashita | B60N 2/0155 296/24.3 |

FOREIGN PATENT DOCUMENTS

| | | |
|---|---|---|
| JP | 2008-184144 A | 8/2008 |
| JP | 4622760 B2 | 2/2011 |
| KR | 2014-0085969 A | 7/2014 |
| KR | 10-1576338 B1 | 12/2015 |

* cited by examiner

FIG 1
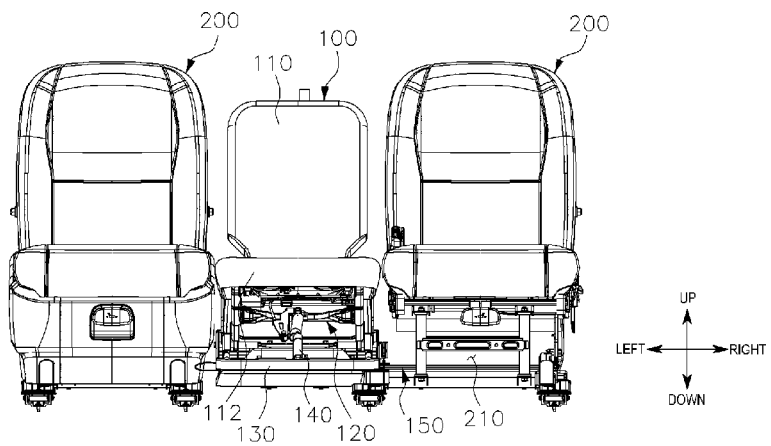
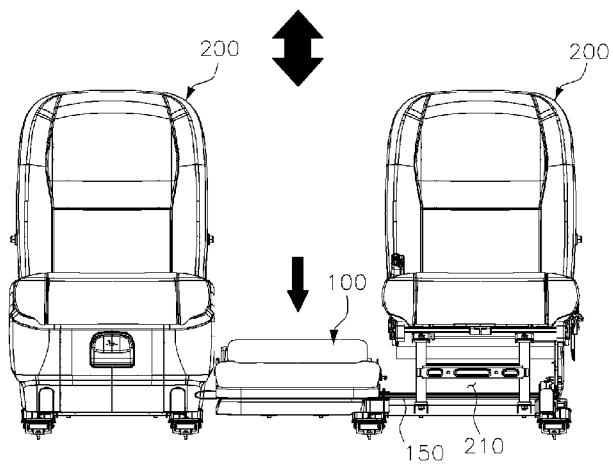
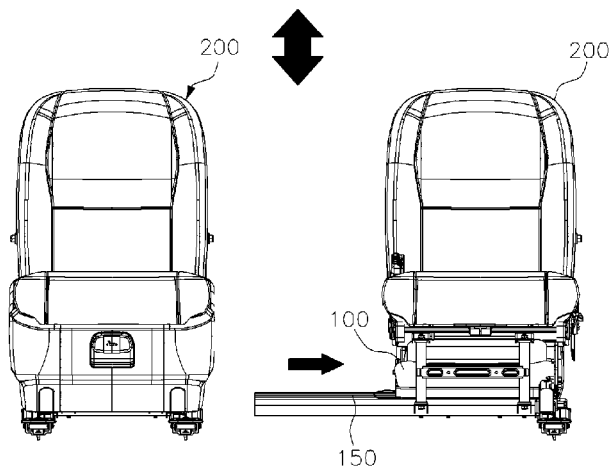

AUXILIARY SEAT STORAGE STRUCTURE

CROSS-REFERENCE TO RELATED APPLICATIONS

This application claims priority under 35 U.S.C. § 119 to Korean Patent Application No. 10-2016-0048521, filed on Apr. 21, 2016 with the Korean Intellectual Property Office, the disclosure of which is incorporated herein by reference in its entirety.

BACKGROUND

1. Field of the Invention

The present invention relates to an auxiliary seat disposed in a second row of a vehicle, and more particularly, to an auxiliary seat storage structure that maximizes convenience when a passenger s enters and exits the vehicle since the auxiliary seat slides along a rail and then is stored in a lower cavity of an exterior seat.

2. Description of the Related Art

Generally, a seat for a vehicle is installed in the vehicle to support an occupant's body and reduce a degree of fatigue caused when the vehicle travels. Further, the seat for a vehicle provides comfortable ride and includes a seat cushion which supports an occupant's hip, a seat back which is coupled to a rear upper portion of the seat cushion to enable adjustment of an angle and a head rest which supports the occupant's head.

For example, a recreational vehicle (e.g., RV) typically includes seats disposed in three rows. An auxiliary seat disposed in a second row is required to perform a reclining operation that enables an angle of a seat back to be adjusted forward and rearward. Further, a fold-and-dive operation rotates the seat back forward and fully folds the seat back. A walk-in operation adjusts the auxiliary seat itself disposed in the second row to allow an occupant seated on the seat in the third row to enter or exit the vehicle. Typically, auxiliary seat in the related art, are disposed in the second row. For example, a jump seat is widely utilized and is disposed between a pair of fixed exterior seats disposed in the second row. The jump seat is folded in the form of a cantilevered beam when the occupant enters or exits the seat disposed in the third row, thereby creating a passageway.

The jump seat includes a structure with a seat back that is fully folded based on a recliner over a seat cushion. The folded seat back and the seat cushion are configured to be adjusted and tilted in a direction of the exterior seat to from a passageway through which a passenger enters or exits the seat disposed in the third row. However, the auxiliary seat structure in the related art requires the folded jump seat to partially occupy one side of the passageway. Accordingly, the occupant is inconvenienced due to a narrow passageway cavity when the occupant enters or exits the seat disposed in the third row. For example, a double folding structure has been proposed in which a seat cushion of an exterior seat is openably and closably installed. When the seat cushion of the exterior seat is opened and an auxiliary seat is stored in the seat cushion by side-folding the auxiliary seat at 180 degrees. However, this structure does not provide for the auxiliary seat to be drawn out or stored when the occupant is seated on the exterior seat or a child seat is installed on the exterior seat.

The double folding structure in the related art stores the auxiliary seat in the exterior seat requires the double folding structure to be operated through four steps of folding a seat back of the auxiliary seat, opening the seat cushion of the exterior seat, side-folding the folded auxiliary seat at 180 degrees and storing the folded auxiliary seat in the exterior seat and closing the seat cushion of the exterior seat, which limits the usability. For example, the auxiliary seat in the related art provides for the seat back to be folded during the fold-and-dive operation and the seat cushion is adjusted forward as much as a length of a link while the seat cushion is dived in conjunction with the fold-and-dive operation. Accordingly, the auxiliary seat causes interference with a seat disposed in a first row or the auxiliary seat is difficult to store.

The above information disclosed in this section is merely for enhancement of understanding of the disclosure, and therefore it should not be understood that the above information is regarded as being the prior art that has been already known to those skilled in the art.

SUMMARY

The present disclosure provides an auxiliary seat storage structure which maximally ensures a passageway cavity and minimizes the number of operating steps. The auxiliary seat may be disposed in a second row in a vehicle and may be configured to slide and be stored in a lower cavity of an exterior seat when folded and divided. Further, the auxiliary seat may be stored regardless of whether an occupant is seated on the exterior seat. The present disclosure further provides an auxiliary seat storage structure that maximizes storage characteristics since a seat cushion does not protrude forward when a fold-and-dive operation of the auxiliary seat is performed and improves convenience because sliding locking is automatically released.

An exemplary embodiment of the present disclosure provides an auxiliary seat storage structure that may include an auxiliary seat disposed between a pair of exterior seats and having a seat back rotatably coupled to a seat cushion via a recliner and a rail disposed in a vehicle width direction to allow the auxiliary seat to be slidable into an internal cavity at a lower end of the exterior seat. The auxiliary seat may be configured to slide along the rail when the auxiliary seat is folded and simultaneously adjusted in a downward direction and may be stored in a lower cavity of the exterior seat.

In the auxiliary seat storage structure according to the exemplary embodiment of the present disclosure, the seat back and the seat cushion of the auxiliary seat may be coupled by a link unit to a tray disposed below the seat back and the seat cushion. For example, when the seat back is folded the seat cushion may be moved in a downward direction and when the auxiliary seat is folded and simultaneously adjusted downward, a front end of the seat back, a front end of the seat cushion, and a front end of the tray may be disposed on the same plane. In the auxiliary seat storage structure according to the exemplary embodiment of the present disclosure the link unit may be a six-articulated link having one degree of freedom that may enable the seat cushion to be adjusted downward in a vertical direction in conjunction with the operation of the seat back when the seat back is folded forward.

In the auxiliary seat storage structure according to the exemplary embodiment of the present disclosure, the link unit may include a first link with a first end coupled to a hinge shaft disposed below the recliner and a second end coupled to the tray; a second link which has a first end coupled to the tray, and a second end coupled to the seat cushion; and a third link which has a first end coupled to the hinge shaft, and the second end coupled to a central portion of the second link. The hinge shaft may operate as a first hinge axis, a portion of a first end of the second link and the tray may be coupled thereto and may form a second hinge axis, a portion of the second end of the first link and the tray may be coupled and may form a third hinge axis, a portion of the second end of the second link and the seat cushion may be coupled together and may form a fourth hinge axis, and a portion of the second end of the third link and the second link may be coupled together and may form a fifth hinge axis.

In the auxiliary seat storage structure according to the exemplary embodiment of the present disclosure, when the seat back is folded forward, the first link may be rotated about the third hinge axis. The third link may be coupled to the first hinge axis and the fifth hinge axis and may be rotated and adjusted in the downward direction. The second link may be rotated about the second hinge axis. In addition, a rear end portion of the first link may be formed in a bent shape bent in an upward direction at a predetermined inclination angle.

The auxiliary seat storage structure according to the exemplary embodiment of the present disclosure may further include a gas spring with a first end coupled to the second link by an operating rod and a second end coupled to the tray and configured to provide an elastic force to the second link. The operating rod may be coupled, by a cable to a strap disposed at a rear side of the seat back. The operating rod may be rotated when the strap is pulled to release the gas spring and the operating rod from each other.

Further, the rail may include an upper rail coupled to the tray disposed below the auxiliary seat and a lower rail fixedly installed in a vehicle width direction between a lower side of the tray and an internal cavity at a lower side of the exterior seat and may be configured to slidably receive the upper rail. The auxiliary seat storage structure according to the exemplary embodiment of the present disclosure may further include a locking pin mounted to protrude in an upward direction by penetrating the upper rail and a locker coupled to a lower end of the locking pin in the upper rail and configured to be movable in vertical directions.

The auxiliary seat storage structure according to the exemplary embodiment of the present disclosure may further include a locking spring disposed between an interior surface of the upper rail and the locker and may be configured to provide an elastic restoring force to the locker. In addition, catching portions may be formed on the lower rail to capture both ends of the locker and when the locker is captured by the catching portion, the sliding movement of the auxiliary seat may be restricted. When the seat back is rotated and the seat cushion is adjusted in a downward direction, the locking pin may be adjusted downward by being pushed by the seat cushion. Further, when the locking pin is adjusted in a downward direction, the locker may be spaced apart from the catching portion and configured to slidably adjust the auxiliary seat.

The present disclosure may increase a passageway cavity (e.g., by about 200 mm or greater) through where a passenger enters and exits the seat disposed in a third row since the folded and dived auxiliary seat may be stored in the lower cavity of the exterior seat by using the rail. Since the present disclosure may store the auxiliary seat by sliding the auxiliary seat when the auxiliary seat is folded, it may be possible to store and draw out the auxiliary seat even when an occupant is seated on the exterior seat or a child seat is installed on the exterior seat.

The present disclosure may improve the convenience and usability for a user since the auxiliary seat may be stored in two steps of folding a seat back of the auxiliary seat and sliding the folded auxiliary seat in a direction of the exterior seat and storing the folded auxiliary seat. Since the seat cushion does not protrude further than a front side of the tray when the fold-and-dive operation of the auxiliary seat is performed, storage ability for storing the auxiliary seat in the lower cavity of the exterior seat may be maximized. The slide locking may be automatically released and the present disclosure may improve convenience and usability for the user.

Consequently, the present disclosure may improve the marketability of the vehicle to meet a user's needs since a two-person mode in which the pair of exterior seats is disposed in a second row in the vehicle. A three-person mode may include the pair of exterior seats and the auxiliary seat disposed in the second row in the vehicle and may be adjusted with each other.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is an exemplary view schematically illustrating an operating process of an auxiliary seat storage structure according to an exemplary embodiment of the present disclosure;

DETAILED DESCRIPTION

Figure 2:
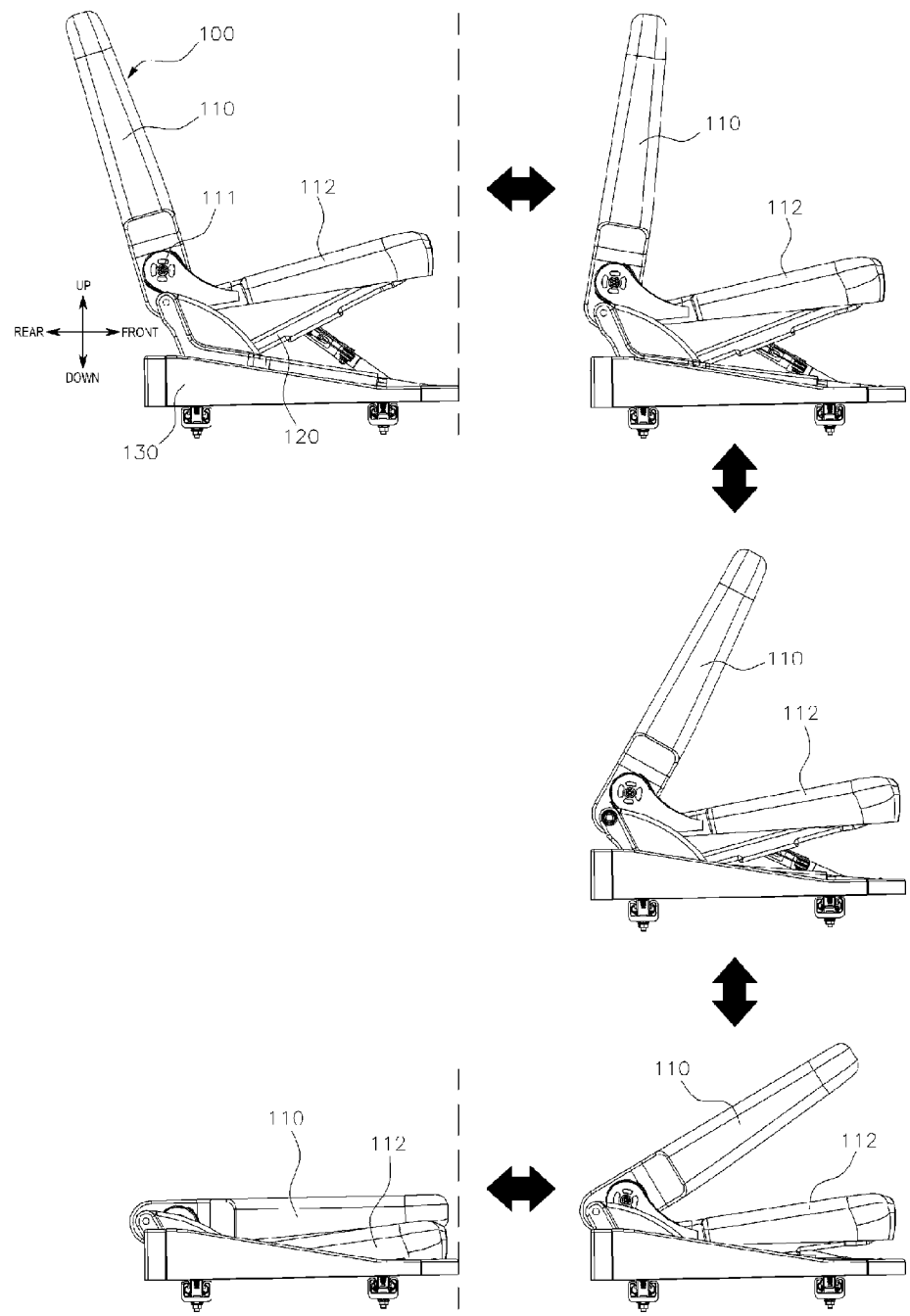
FIG. 2 is an exemplary view illustrating an overall fold-and-dive operation of an auxiliary seat according to the exemplary embodiment of the present disclosure.

The present invention will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present disclosure, and the same or similar constituent elements will be designated by the same reference numerals throughout the specification. Terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own disclosure by the best method.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary view schematically illustrating an operating process of an auxiliary seat storage structure according to an exemplary embodiment of the present disclosure. As illustrated in FIG. 1, the auxiliary seat storage structure according to the exemplary embodiment of the present invention may include a pair of exterior seats 200 and an auxiliary seat 100 disposed between the exterior seats 200 that may be disposed in a second row in a vehicle.

The auxiliary seat 100 may include a seat back 110 and a seat cushion 112. The seat back 110 may be rotated and folded in a direction of the seat cushion 112 by the recliner 111. When the seat back 110 is folded, the seat cushion 112 may be adjusted in a downward direction to perform a fold-and-dive operation of the auxiliary seat 100. A rail 150 may be installed below the auxiliary seat 100 in a vehicle width direction and the auxiliary seat may be configured to slide into a lower cavity 210 of the exterior seat 200. A user may store the auxiliary seat by sliding the auxiliary seat in the direction of the exterior seat 200 when the auxiliary seat 100 is folded and simultaneously adjusted in a downward direction (e.g., fold-and-dive operation).

In particular, the auxiliary seat 100 according to the present disclosure may be stored through two steps that may include folding a seat back of the auxiliary seat and storing the folded auxiliary seat by sliding the folded auxiliary seat in the direction of the exterior seat. Alternatively, the auxiliary seat 100 may be drawn out (e.g., expanded) through two steps of drawing out the folded auxiliary seat by sliding the folded auxiliary seat and unfolding the seat back of the auxiliary seat. Therefore, the present disclosure may increase a passageway cavity through which the occupant enters and exits the seat disposed in a third row. Further, the auxiliary seat 100 may be stored and drawn out even when an occupant is seated on the exterior seat 200 or a child seat is installed on the exterior seat 200, and the convenience and usability may be improved.

FIG. 2 is an exemplary view illustrating an overall fold-and-dive operation of the auxiliary seat according to the exemplary embodiment of the present disclosure. As illustrated in FIG. 2, the seat back 110 and the seat cushion 112 of the auxiliary seat 100 may be coupled by a link unit 120 to the tray 130 disposed below the seat back 110 and the seat cushion 112. For example, when the seat back 110 is folded, the seat cushion 112 may be adjusted in a downward direction (e.g., dived).

Figure 5:
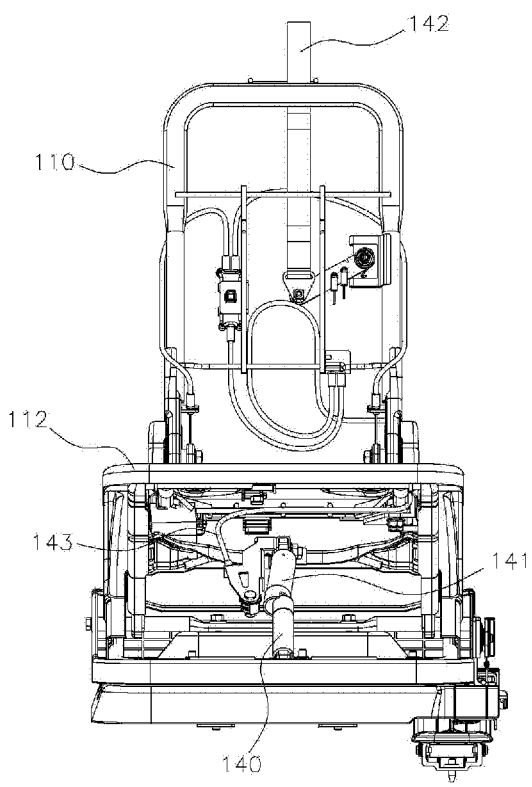
FIG. 5 is an exemplary view illustrating an appearance of the auxiliary seat when a gas spring is installed according to the exemplary embodiment of the present disclosure.

When the user rotates the seat back 110 forward when the recliner 111 is unlocked by pulling a strap 142 as shown in FIG. 5 to be described below, the seat cushion 112, coupled to the tray 130 by the link unit 120 may be adjusted in a downward direction in conjunction with the rotation of the seat back 110. Accordingly, the auxiliary seat 100 may be folded in a flatwise manner and folded and divided. In other words, when the auxiliary seat 100 is folded and divided, a front end of the seat cushion 112 does not protrude further than a front end of the tray 130 and a front end of the seat back 110 the front end of the seat cushion 112 and the front end of the tray 130 may be positioned on the same plane (e.g., as indicated by a dotted line in the drawing).

Figure 3:
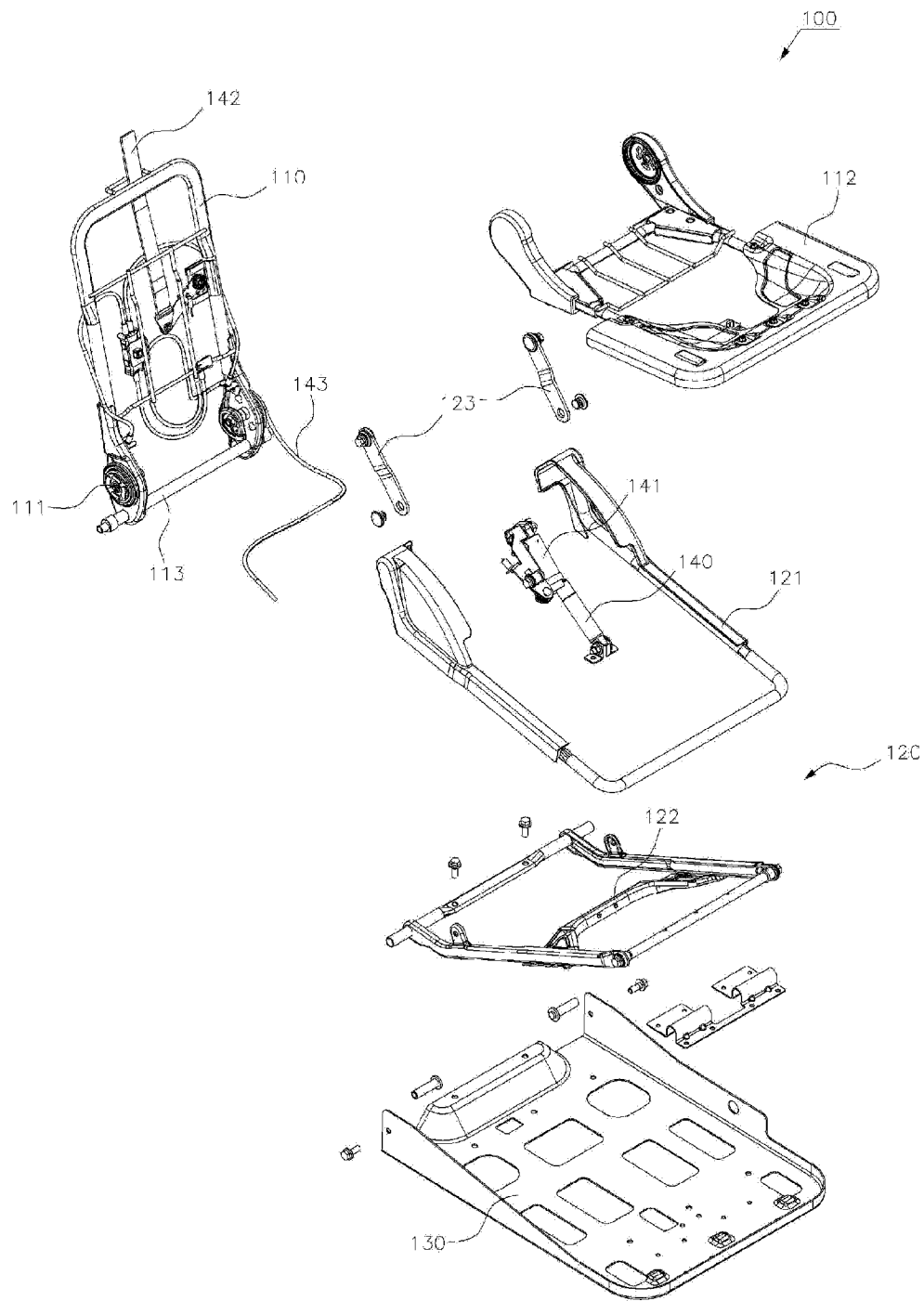
FIG. 3 is an exemplary view illustrating respective components of the auxiliary seat disassembled according to the exemplary embodiment of the present disclosure.
Figure 4:
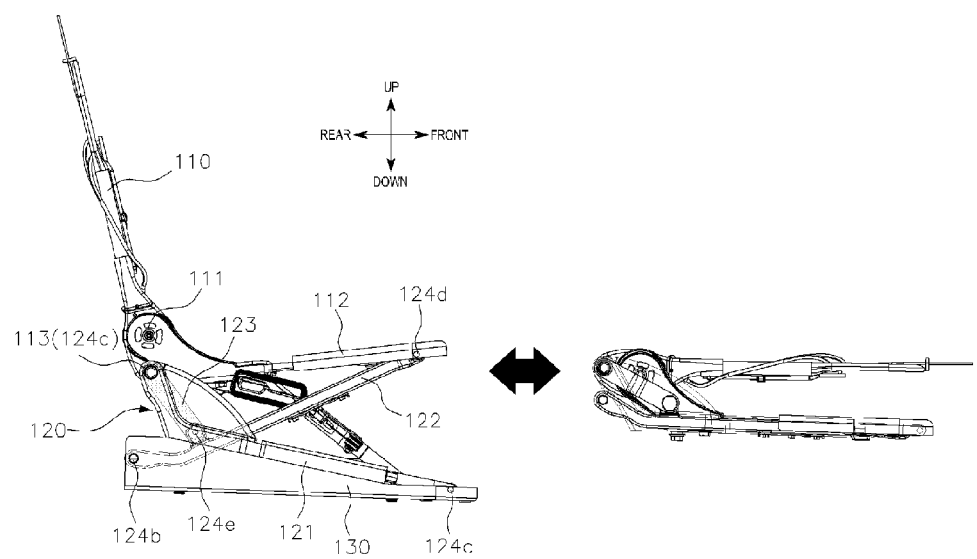
FIG. 4 is an exemplary view illustrating the fold-and-dive operation of the auxiliary seat according to the exemplary embodiment of the present disclosure.

FIG. 3 is an exemplary view illustrating an assembled state of the respective components of the auxiliary seat according to the exemplary embodiment of the present disclosure. As shown, FIG. 4 is a view illustrating the fold-and-dive operation of the auxiliary seat according to the exemplary embodiment of the present disclosure. As illustrated, the link unit 120 may be a six-articulated link with one degree of freedom and may be configured to be vertically adjusted in a downward direction together with the seat cushion 112 when the seat back 110 is folded forward.

Specifically, the link unit 120 may include a first link 121 which has a first end (e.g., a left end in the illustrated exemplary embodiment) coupled to a hinge shaft 113 disposed below the recliner 111. A second end (e.g., a right end in the illustrated exemplary embodiment) may be coupled to the tray 130. A second link 122 may include a first end coupled to the tray 130 and a second end coupled to the seat cushion 112, and a third link 123 which has a first end coupled to the hinge shaft 113 and a second end coupled to a central portion of the second link 122. The first link 121 may be formed as c shaped beam (e.g., '⊏'-shaped) beam. A rear end portion of the first link 121 may be formed in a bent shape bent in an upward direction at a predetermined inclination angle. The second link 122 may be formed as two vertical lines disposed with a horizontal line therebetween (e.g., 'H'-shaped) beam and the third link 123 may be formed as a '—'-shaped beam.

For example, the hinge shaft 113 may form a first hinge axis 124a. A portion (e.g., a left lower portion) where a first end of the second link 122 and the tray 130 are coupled may form a second hinge axis 124b. A portion (e.g., a right lower portion) where the second end of the first link 121 and the tray 130 are connected may form a third hinge axis 124c. A portion (e.g., a right upper portion) where the second end of the second link 122 and the seat cushion 112 are connected may form a fourth hinge axis 124d. A portion (e.g., a central portion) where the second end of the third link 123 and the second link 122 are connected may form a fifth hinge axis 124e. The recliner 111 may provide one rotation axis, with the link unit 120 configured as a six-articulated link.

When the user rotates the seat back 110 forward, the recliner 111 may be unlocked by the user. The first link 121 coupled with the rotation axis of the recliner 111 through the first hinge axis 124a may be rotated about a third rotation axis. The third link 123 may be coupled to the first hinge axis 124a and the fifth hinge axis 124e and rotated and adjusted in a downward direction in conjunction with the rotation of the first link 121. The second link 122 may be configured to be rotated about a second rotation axis. During this operating process, the seat cushion 112 may be adjusted in a downward direction. The auxiliary seat 100 may be folded and simultaneously adjusted in a downward direction (e.g., folded and dived) and may be stored as illustrated in a lower drawing in FIG. 4. Accordingly, the shape of the auxiliary seat 100 may be fixed by locking the recliner 111.

Figure 6:
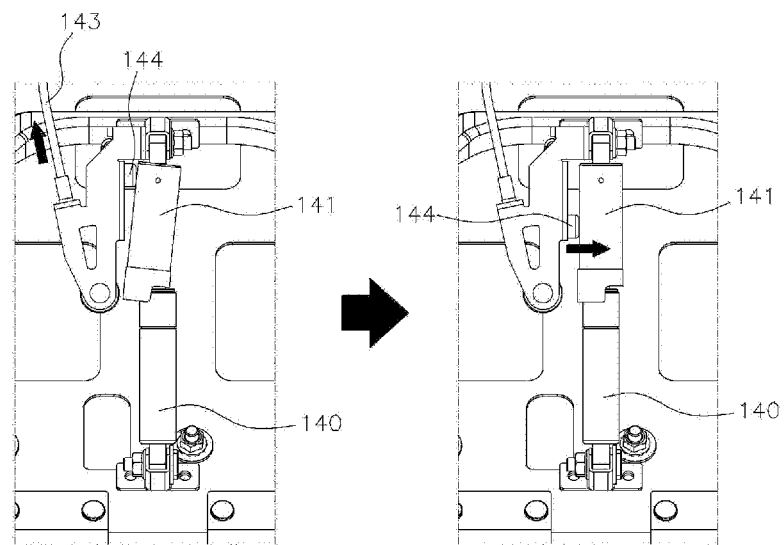
FIG. 6 is an exemplary view illustrating an operating process of the gas spring according to the exemplary embodiment of the present disclosure.

FIG. 5 is an exemplary view illustrating an appearance of the auxiliary seat when a gas spring according to the exemplary embodiment of the present disclosure is installed FIG. 6 is an exemplary view illustrating an operating process of the gas spring according to the exemplary embodiment of the present disclosure. As illustrated in FIG. 5, the auxiliary seat 100 according to the present disclosure may further include a gas spring 140 with a first end (e.g., an upper end in the illustrated exemplary embodiment) coupled to the second link 122 via an operating rod 141 and a second end (e.g., a lower end in the illustrated exemplary embodiment) coupled to the tray 130 and may be configured to provide elastic force to the second link 122.

The operating rod 141 may be coupled, by a cable 143 to the strap 142 disposed at a rear side of the seat back 110. For example, when the strap 142 is pulled, the operating rod 141 may be rotated to release the gas spring 140 and the operating rod 141 from each other. In other words, as illustrated in FIG. 6, before the cable 143 is pulled through the strap 142, the operating rod 141 and the gas spring 140 are not placed coaxially but may be disposed in a non-linearly aligned with each other. A first side of the operating rod 141 may be captured and supported by the upper end of the gas spring 140 and as a result, the auxiliary seat 100 may remain unfolded.

When the user pulls the cable 143 through the strap 142 to fold the auxiliary seat 100, an operating pin 144, coupled to the cable 143 may be adjusted in a downward direction to apply a force to shift the operating rod 141 to the right. The operating rod 141 and the gas spring 140 may be placed coaxially and may be released from each other and to allow the gas spring 140 to be inserted into the operating rod 141. Therefore, by pulling the strap 142 the user may unlock the recliner 111 and may simultaneously release the gas spring 140. Accordingly the auxiliary seat 100 may be folded and divided by folding the seat back 110 forward.

Figure 7:
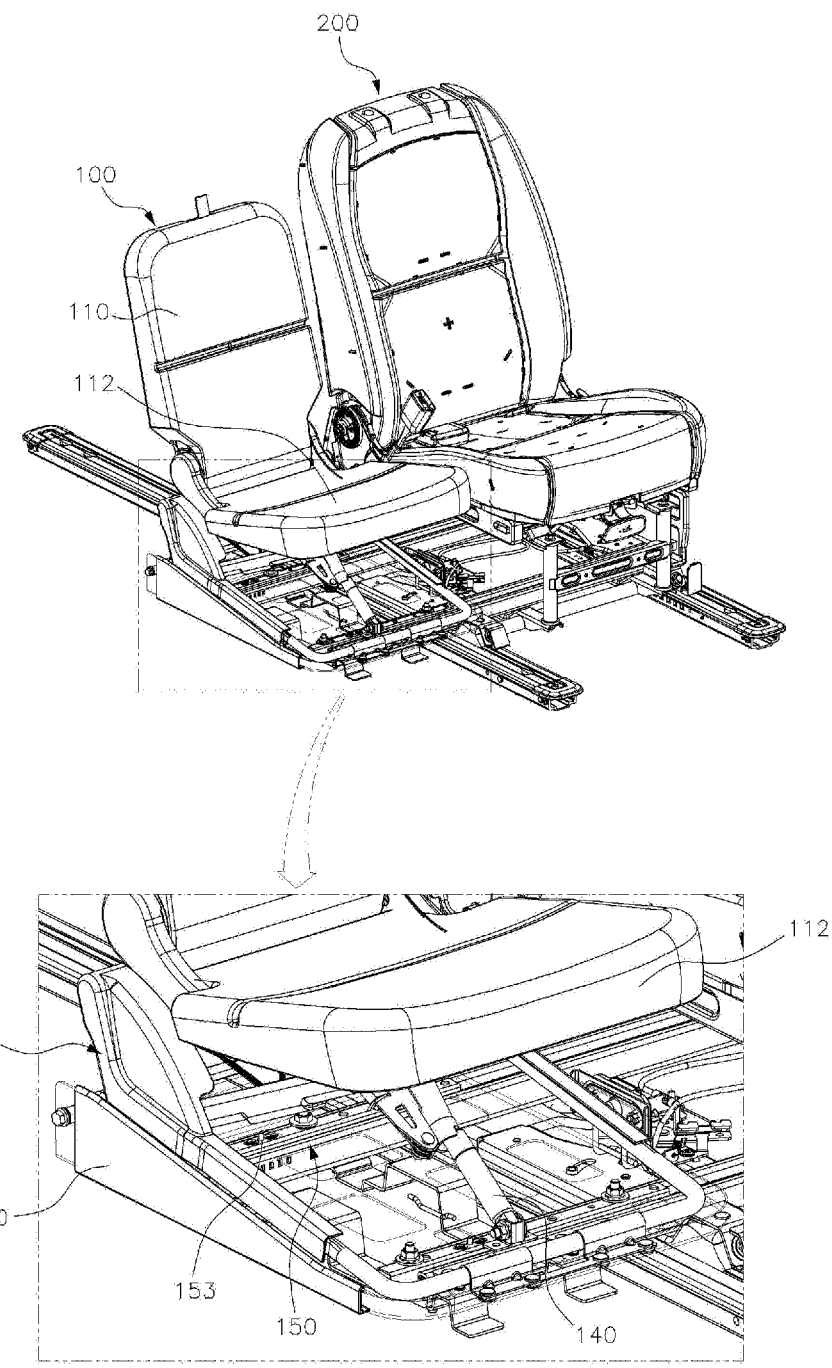
FIG. 7 is an exemplary view illustrating an appearance of the auxiliary seat when a rail is installed according to the exemplary embodiment of the present disclosure.
Figure 8:
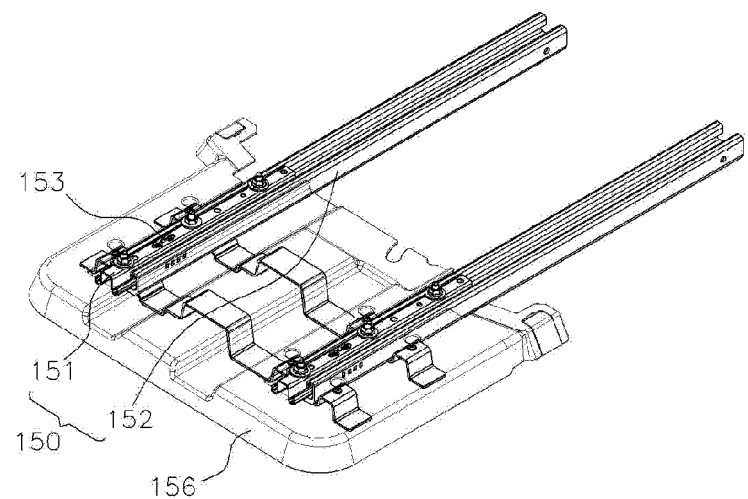
FIG. 8 is an exemplary view illustrating an appearance of the rail according to the exemplary embodiment of the present disclosure.
Figure 9:
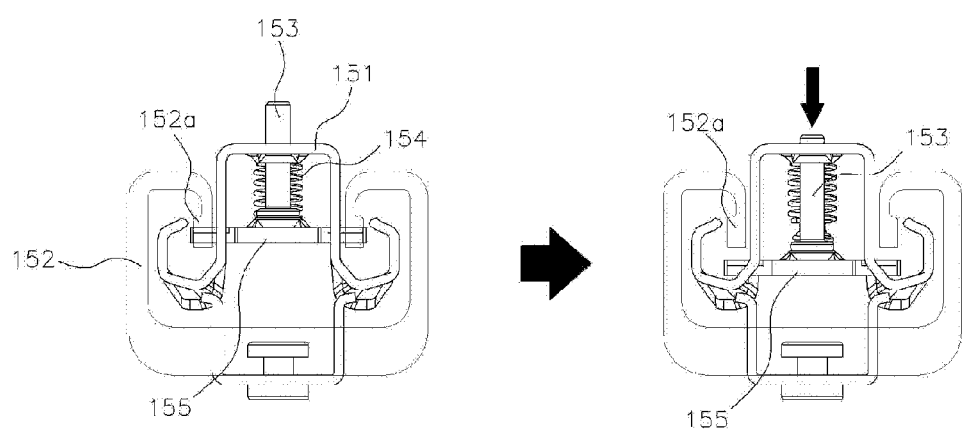
FIG. 9 is an exemplary cross-sectional view illustrating an operating process of a locker according to the exemplary embodiment of the present disclosure.

FIG. 7 is an exemplary view illustrating an appearance of the auxiliary seat with a rail according to the exemplary embodiment of the present disclosure disposed thereon. FIG. 8 is an exemplary view illustrating an appearance of the rail according to the exemplary embodiment of the present disclosure. FIG. 9 is an exemplary cross-sectional view illustrating an operating process of a locker according to the exemplary embodiment of the present disclosure. As illustrated, the rail 150 may include a pair of upper rails 151 coupled to the tray 130 disposed below the auxiliary seat 100 and a pair of lower rails 152 configured to slidably receive the upper rails 151. The upper rails 151 may be configured to slide on the lower rails 152. The auxiliary seat 100 may be stored in the lower cavity 210 of the exterior seat 200 to provide a passageway cavity or may be unfolded between the pair of exterior seats 200 to allow an occupant to be seated on the auxiliary seat 100.

As illustrated in FIG. 8, the lower rail 152 may be installed in a vehicle width direction between a lower side of the tray 130 and the lower cavity 210 of the exterior seat 200 and may be coupled to a floor of the vehicle through a rail cover 156. As illustrated in FIG. 7, a locking pin 153 may be mounted in the upper rail 151. The locking pin 153 may protrude in an upward direction by penetrating the upper rail 151 and the tray 130. A locker 155 may be coupled to a lower end of the locking pin 153 and may be adjusted in vertical directions in the upper rail 151. The locking pin 153 and the locker 155 may be perpendicularly coupled to each other and may form a shape and may be configured to inhibit the upper rail 151 from sliding along the lower rail 152 or may be configured to allow the sliding movement of the upper rail 151. Accordingly, the movement of the auxiliary seat 100 may be allowed or restricted.

As illustrated in FIG. 9, a locking spring 154, which provides an elastic restoring force to the locker may be mounted between an upper side of an interior surface of the upper rail 151 and the locker 155. Further, catching portions 152a may be formed within the interior of the lower rail 152 and may be configured to capture both ends of the locker 155. As illustrated in the left drawing in FIG. 9, when the auxiliary seat 100 is unfolded, the locker 155 may be adjusted in the upward direction by the locking spring 154 and may be captured by the catching portions 152a. Accordingly, the sliding movement of the auxiliary seat 100 may be restricted. As illustrated in the right drawing in FIG. 9, when the user folds the auxiliary seat 100, the seat cushion 112 may be adjusted in a downward direction. The locking pin 153 may be pushed by the seat cushion 112 to be adjusted in a downward direction to overcome an elastic force of the locking spring 154 and the locker 155 may be separated from the catching portions 152a. Accordingly, the sliding movement of the auxiliary seat 100 may be allowed. Since the slide locking may be automatically unlocked in conjunction with operations of the seat back 110 and the seat cushion 112 when the fold-and-dive operation of the auxiliary seat 100 is performed, the convenience for the user may be improved.

The present disclosure, may store the folded and dived auxiliary seat 100 in the lower cavity 210 of the exterior seat 200 through the rail 150. Accordingly, a passageway cavity through which the passenger enters or exits the seat disposed in the third row may be improved. Since the present disclosure may store the auxiliary seat 100 by sliding the auxiliary seat 100 when the auxiliary seat 100 is folded, the auxiliary seat may be stored or drawn out even when an occupant is seated on the exterior seat 200 or a child seat is installed on the exterior seat. Since the seat cushion 112 does not protrude further than a front side of the tray 130 when the fold-and-dive operation of the auxiliary seat 100 is performed, the storage capacity for storing the auxiliary seat 100 in the lower cavity 210 of the exterior seat 200 may be maximized and the number of steps of operating the auxiliary seat may be minimized as a result. The present disclosure may improve convenience and usability for the user.

The present disclosure, which has been described above, is not limited by the aforementioned exemplary embodiment and the accompanying drawings, and it is obvious to those skilled in the art to which the present disclosure pertains that various substitutions, modifications and alterations may be made without departing from the technical spirit of the present disclosure.

What is claimed is:

1. An auxiliary seat storage structure, comprising:
an auxiliary seat disposed between a pair of exterior seats, and has a seat back rotatably coupled to a seat cushion by a recliner; and
a rail disposed in a vehicle width direction and the auxiliary seat is slidable into an internal cavity at a lower end of the exterior seat,
wherein the auxiliary seat is configured to slide along the rail when the auxiliary seat is folded and simultaneously adjusted in a downward direction, and is stored in a lower cavity of the exterior seat,
wherein the rail includes:
an upper rail coupled to the tray disposed below the auxiliary seat; and
a lower rail fixedly installed in a vehicle width direction between a lower side of the tray and an internal cavity at a lower side of the exterior seat, and configured to slidably receive the upper rail.

2. The auxiliary seat storage structure of claim 1, wherein the seat back and the seat cushion of the auxiliary seat are coupled by a link unit, to a tray disposed below the seat back and the seat cushion, and when the seat back is folded, the seat cushion is adjusted in the downward direction.

3. The auxiliary seat storage structure of claim 2, wherein when the auxiliary seat is folded and simultaneously adjusted in the downward direction, a front end of the seat back, a front end of the seat cushion, and a front end of the tray are disposed on the same plane.

4. The auxiliary seat storage structure of claim 2, wherein the link unit is a six-articulated link having one degree of freedom, the seat cushion is adjusted vertically in the downward direction in conjunction with the adjustment of the seat back in a folded forward direction.

5. The auxiliary seat storage structure of claim 2, wherein the link unit includes:

a first link with a first end coupled to a hinge shaft disposed below the recliner, and a second end coupled to the tray;
a second link with a first end coupled to the tray, and a second end coupled to the seat cushion; and
a third link with a first end coupled to the hinge shaft, and a second end coupled to a central portion of the second link.

6. The auxiliary seat storage structure of claim 5, wherein the hinge shaft provides a first hinge axis, a portion of a first end of the second link and the tray are coupled and provides a second hinge axis,
wherein a portion of the second end of the first link and the tray are coupled and provides a third hinge axis
wherein a portion of the second end of the second link and the seat cushion are coupled and provides as a fourth hinge axis, and
wherein a portion of the second end of the third link and the second link are coupled and provides a fifth hinge axis.

7. The auxiliary seat storage structure of claim 6, wherein when the seat back is folded forward, the first link is configured to rotate about the third hinge axis.

8. The auxiliary seat storage structure of claim 6, wherein when the third link is coupled to the first hinge axis and the fifth hinge axis and is configured to rotated and move in a downward direction, the second link may be configured to be rotated about the second hinge axis.

9. The auxiliary seat storage structure of claim 5, wherein a rear end portion of the first link is formed in a bent shape bent in an upward direction at a predetermined inclination angle.

10. The auxiliary seat storage structure of claim 5, further comprising:
a gas spring with a first end coupled to the second link by an operating rod, and a second end coupled to the tray, and is configured to provide an elastic force to the second link.

11. The auxiliary seat storage structure of claim 10, wherein the operating rod is coupled, by a cable, to a strap disposed at a rear side of the seat back, and the operating rod is configured to rotate when the strap is pulled to release the gas spring and the operating rod from each other.

12. The auxiliary seat storage structure of claim 1, further comprising:
a locking pin mounted to protrude upward by penetrating the upper rail; and
a locker coupled to a lower end of the locking pin in the upper rail, and configured to be movable in vertical directions.

13. The auxiliary seat storage structure of claim 12, further comprising:
a locking spring interposed between an interior surface of the upper rail and the locker, and configured to provide an elastic restoring force to the locker.

14. The auxiliary seat storage structure of claim 12, wherein catching portions are formed on the lower rail to capture both ends of the locker by the catching portions, and configured to restrict the sliding movement of the auxiliary seat when the locker is captured by the catching portion.

15. The auxiliary seat storage structure of claim 14, wherein the locking pin is configured to move in a downward direction by being pushed by the seat cushion when the seat back is rotated and the seat cushion is adjusted downward, and when the locking pin is moved downward, the locker is spaced apart from the catching portion to allow the sliding movement of the auxiliary seat.

\* \* \* \* \*